UNITED STATES PATENT OFFICE.

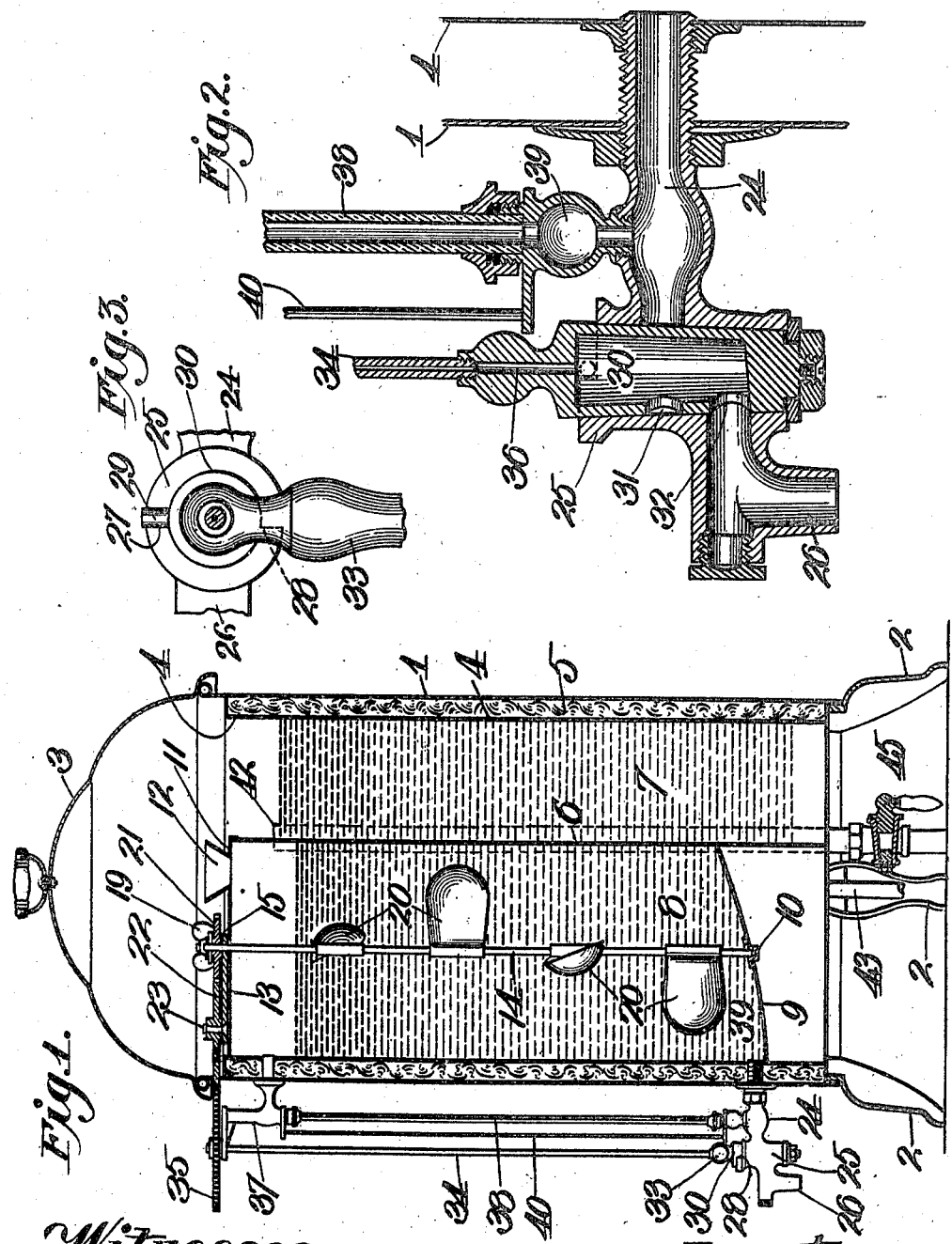

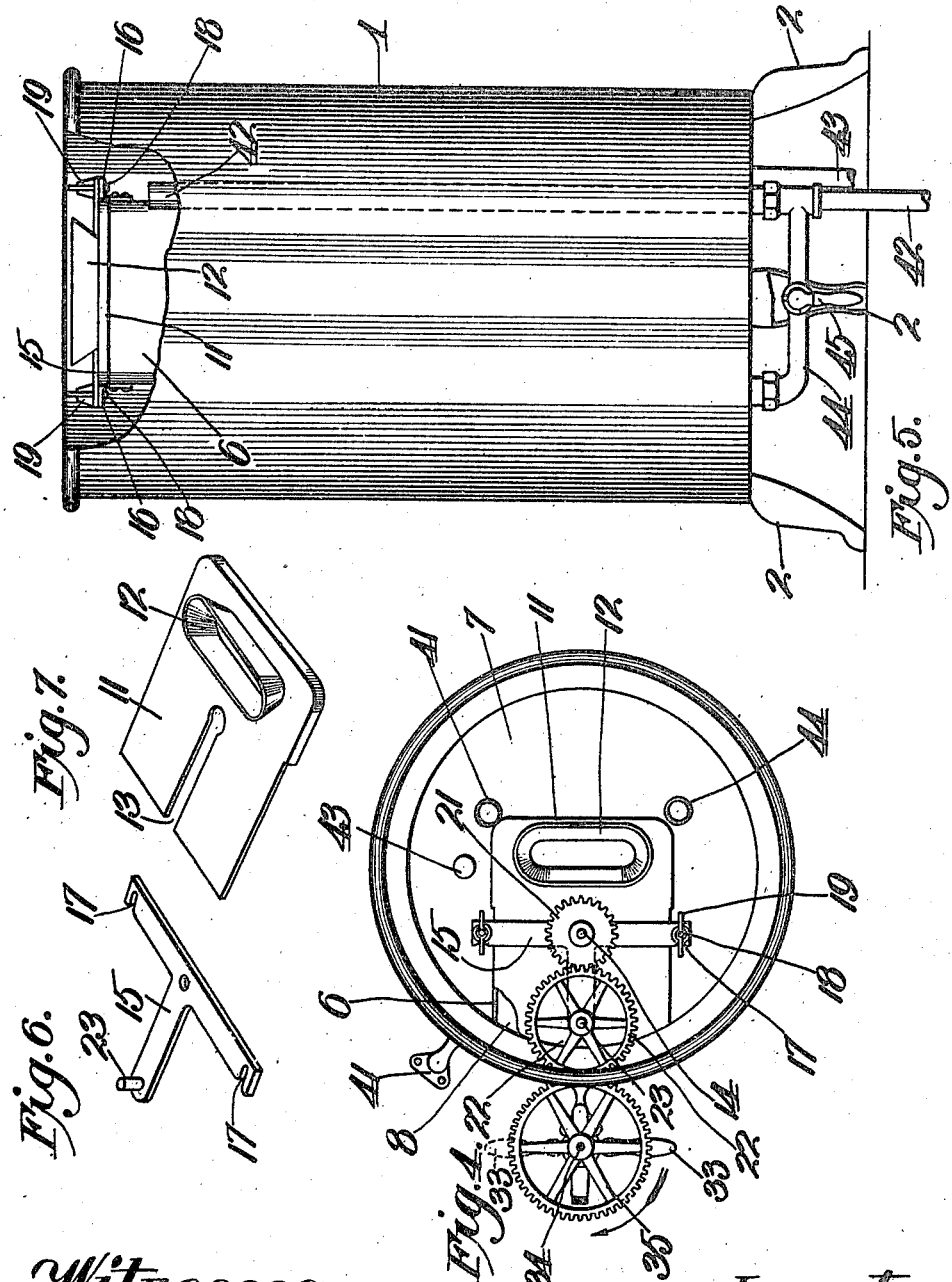

HENRY D. KELLY, OF KANSAS CITY, MISSOURI.

DISPENSING-URN.

1,092,997. Specification of Letters Patent. Patented Apr. 14, 1914.

Application filed February 12, 1912. Serial No. 677,143.

*To all whom it may concern:*

Be it known that I, HENRY D. KELLY, a citizen of the United States, residing at Kansas City, in the county of Jackson and State of Missouri, have invented certain new and useful Improvements in Dispensing-Urns, of which the following is a specification.

This invention relates to dispensing urns for liquids, and has for its object to produce a device of this character having a faucet for measuring and delivering fixed quantities of the contents of the urn, the urn being designed chiefly as a dispenser of cream in restaurants where it is customary to pour the cream into the coffee before delivering the latter to the customer.

Another object is to produce an urn equipped with a faucet having a measuring plug-member normally closed to the charging passage and open to the spout of the faucet and adapted when moved in one direction to successively close and open said spout and charging passage respectively, and when moved back to its original position to successively close and open said charging passage and spout respectively.

Another object is to produce an urn having faucet-actuated means for thoroughly stirring or agitating the contents of the urn prior to the opening up of communication between the urn and faucet.

With these general objects and others of a subsidiary character in view, the invention consists in certain novel and peculiar features of construction and organization as hereinafter described and claimed; and in order that it may be fully understood reference is to be had to the accompanying drawing, in which—

Figure 1, is a central vertical section of an urn embodying the invention, designed chiefly for dispensing measured quantities of cream. Fig. 2, is an enlarged vertical section of the faucet, a portion of the urn, the liquid gage, and a combined vent tube and shaft. Fig. 3, is a plan view of part of the faucet. Fig. 4, is a top plan view of the urn with its cover omitted. Fig. 5, is a rear view of the urn with its shell partly broken away to disclose parts otherwise hidden. Fig. 6, is a perspective view of a bearing bracket forming part of the device. Fig. 7, is a perspective view of a splash top for the chamber charged with the liquid to be dispensed.

In the said drawings, 1 is the shell of an urn, preferably equipped with legs 2 and a cover 3, and arranged concentrically within said shell is a cylinder 4, constituting a lining for the shell, the space between the shell and lining being filled with cork 5 or its equivalent, for insulation purposes. The interior of the urn is divided by a U-shaped partition 6, into a water and ice chamber 7, and a cream chamber 8, and the latter has a bottom 9, sloping downward to the point of discharge, as hereinafter more particularly referred to, and provided with a socket 10.

The cream chamber has a removable top 11, to prevent cream splashing out when stirred or agitated, and said splash top is equipped with a funnel 12, through which cream can be readily poured into chamber 8, and is bifurcated or slotted at 13 to accommodate a vertical shaft 14 journaled at its lower end in socket 10 and at its upper end in a T-shaped bracket 15, resting upon the splash top, and a pair of lugs 16, projecting outwardly from opposite sides of the U-shaped partition, and to retain the bracket reliably in place and provide for its quick removal, it is provided with notches 17 receiving bolts 18, extending from said lugs and equipped with nuts 19 whereby the bracket is clamped in position.

The shaft 14 is provided with blades 20, for thoroughly stirring or agitating the contents of chamber 8, and is equipped at its upper extremity with a cog pinion 21, meshing with a gear wheel 22, journaled on a stub shaft 23 projecting upward from the bracket 15.

Communicating with chamber 8 at its point of discharge is a faucet having a receiving passage 24, a hollow body 25, and a spout 26, the latter communicating with the said body in a lower plane than the said receiving passage. The body has the customary shoulders or stops 27, and 28, for engagement by stop pin 29, of the faucet plug 30, arranged to turn in the body. This plug is hollow and adapted to hold a predetermined quantity of cream, and is provided with a receiving port 31 in the horizontal plane of passage 24 and a delivery port 32 in the plane of the spout. The plug is provided with the customary handle 33 and with a tubular shaft 34 for transmitting power through a gear wheel 35, on its upper end, to gear wheel 22 and forming a continuation of air vent passage 36 of the plug.

The upper end of shaft 34 is journaled in a bracket 37, secured to the shell and establishing communication between chamber 8 and the upper end of a gage tube 38, communicating at its lower end with a coupling 39 secured to the faucet and communicating with the passage 24 thereof, the usual guard rods 40 for the tube 38 being also provided. This gage shows at a glance, the quantity of cream in chamber 8, and a similar gage 41, shown only in plan, Fig. 4, is employed to indicate the level of the water in chamber 7, and to guard against overfilling said chamber 7, it is provided with an overflow pipe 42, a pipe 43 connected to a house-pipe not shown, being employed as a means for quickly filling chamber 7. Ice can be introduced into chamber 7 to maintain the cream at the proper temperature.

To drain the water from the urn, a drain pipe 44 extends from the overflow pipe into chamber 7 and is controlled by a valve 45.

Assuming the chamber 8 is charged with cream and that an attendant desires some for a cup of coffee, he turns the handle 33 from the full-line position to the dotted line position, Fig. 4, and thus, through the instrumentality of shaft 34 and the gearing described, rapidly revolves the shaft 14 and thoroughly stirs or agitates the cream in chamber 8, the blades shown tending to produce opposing counter currents in the cream to insure violent agitation. Just before the said movement of the handle ends, cream begins to enter the hollow plug through port 31 thereof registering with passage 24, the filling operation being completed by the time stop-pin 29 strikes shoulder 28, it being noted that the air is vented from the plug during this filling thereof and that communication between the plug and the spout is closed. Upon the return of the handle to its initial position, the cream is again agitated and communication is closed between the plug and passage 24 before port 32 registers with the spout to permit the charge of cream in the plug to flow through the spout into the coffee cup or other receptacle.

From the foregoing it will be seen that an urn possessing the features of advantage enumerated as desirable will be found useful in many situations and particularly in restaurants, as by its use each customer will receive an equal quantity of cream of uniform quality.

I claim:

1. A dispensing urn provided with a faucet casing, having a receiving passage communicating with the interior of the urn, and a discharge opening exterior of the urn, a hollow valve plug provided with openings for communicating alternately with said receiving passage and discharge opening, said plug being movable about a vertical axis within said casing and provided with an axial opening in its upper end for maintaining constant communication between the interior of the plug and the outside air.

2. A dispensing urn having a faucet provided externally of the urn with a hollow valve plug mounted to rotate about a vertical axis, said valve plug having an axial opening in its upper end, a vertical tubular shaft connected to said valve plug in communication with said opening, said shaft being open at its upper end to provide constant access of air to the interior of said valve plug, a shaft extending vertically inside the urn and carrying agitating blades, and gear connections between said shafts whereby rotation of the valve plug operates the blade carrying shaft.

3. A dispensing urn having a faucet provided externally of the urn with a rotary valve plug, a shaft connected to said valve plug, a shaft extending through the urn and carrying agitating blades, and gear connections between said shafts whereby rotation of the valve plug rotates the blade carrying shaft.

In testimony whereof I affix my signature, in the presence of two witnesses.

HENRY D. KELLY.

Witnesses:
H. C. RODGERS,
G. Y. THORPE.